June 4, 1968 W. F. MELLEN 3,386,518
PLOWS
Filed Oct. 22, 1965 3 Sheets-Sheet 1

INVENTOR.
WILLIAM FISK MELLEN
BY
ATTORNEY

June 4, 1968   W. F. MELLEN   3,386,518
PLOWS
Filed Oct. 22, 1965   3 Sheets-Sheet 2
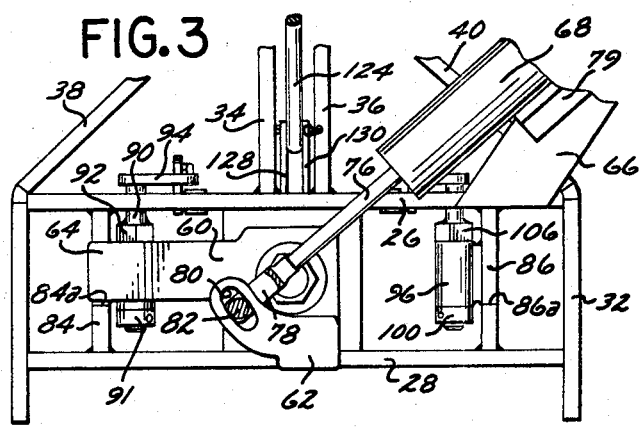
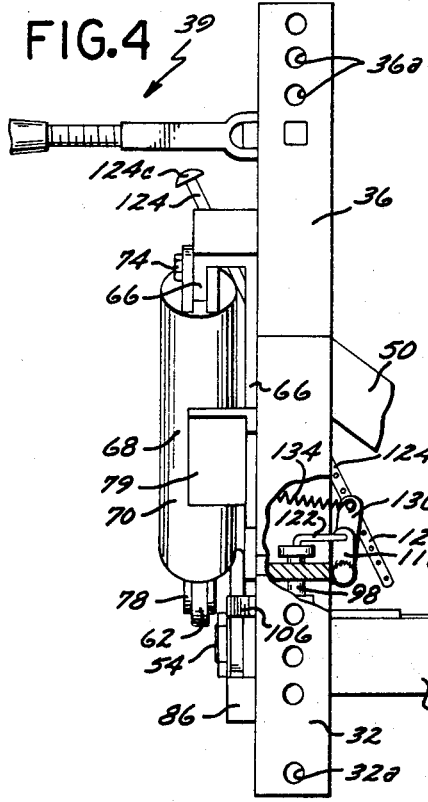
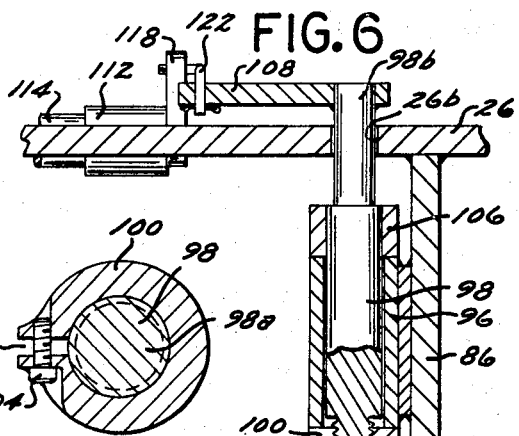
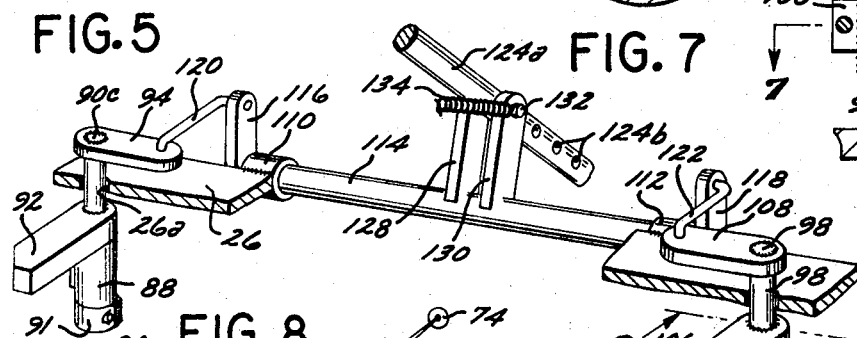
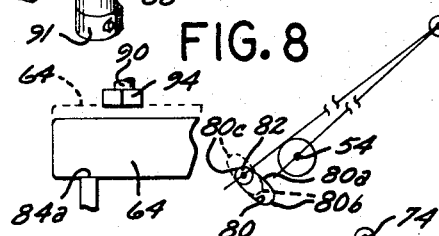
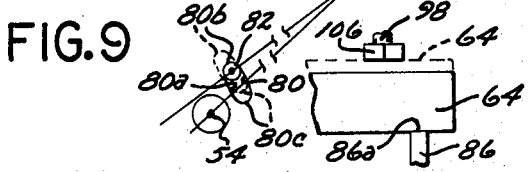
INVENTOR.
WILLIAM FISK MELLEN
BY
ATTORNEY

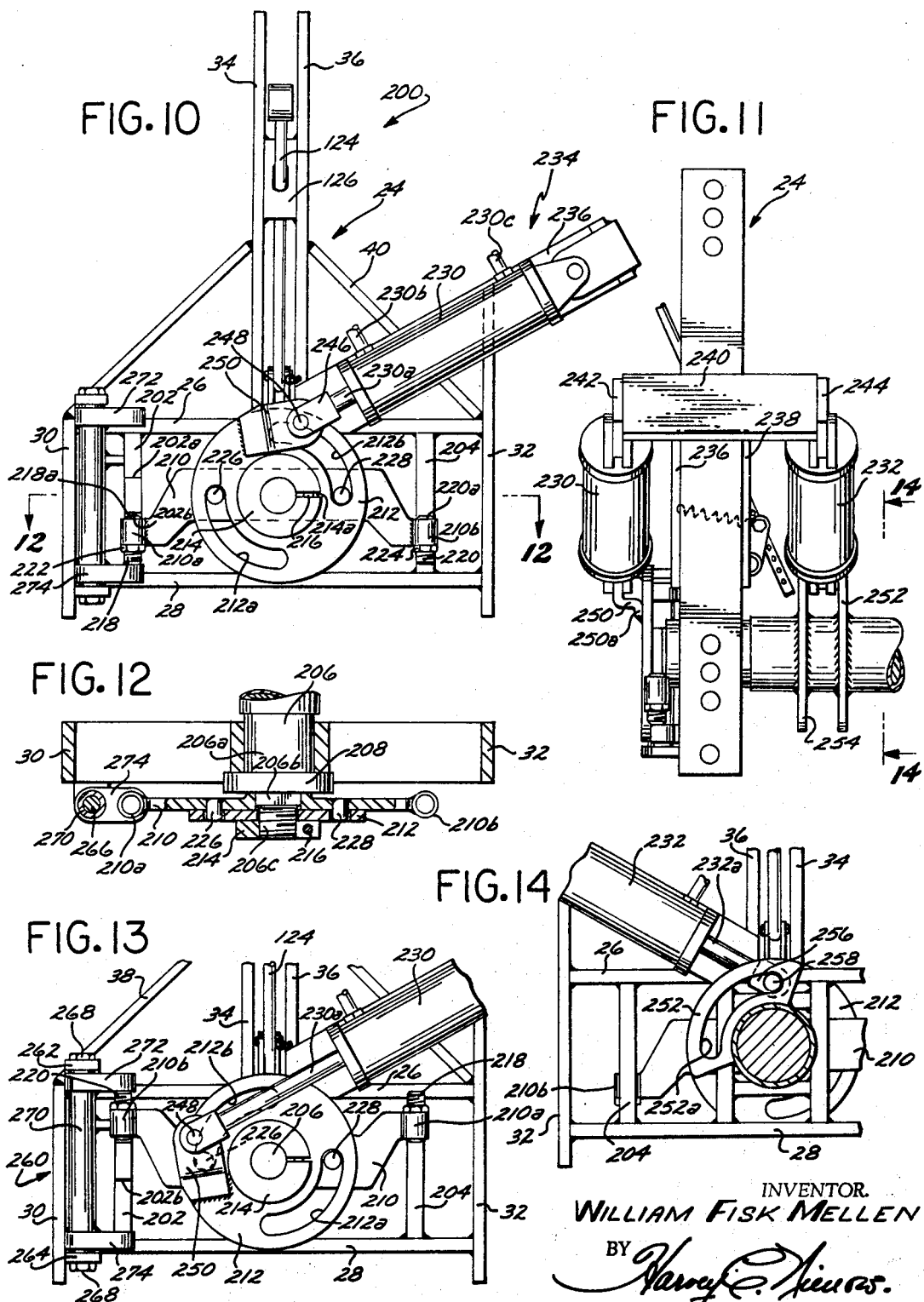

3,386,518
PLOWS
William Fisk Mellen, Anaheim, Calif.
(P.O. Box 488, Fullerton, Calif. 92632)
Continuation-in-part of application Ser. No. 437,797,
Mar. 8, 1965. This application Oct. 22, 1965, Ser.
No. 507,618
5 Claims. (Cl. 172—225)

ABSTRACT OF THE DISCLOSURE

Actuating means and stop means for rotating a two-way plow assembly between its two extreme operating positions. Said operating means comprises lost motion connecting means between a pair of hydraulic actuators and the plow assembly such that the actuators operate alternatively with one actuator moving the assembly approximately ninety degrees from one operating position, and thereafter the other actuator retarding the force of gravity in moving the plow assembly to its second operating position. The stop means includes latching means for blocking return movement of an arm or stop member connected to the plow assembly when the latter reaches one or the other of its extreme positions.

---

The present application is a continuation-in-part of my application Ser. No. 437,797, filed Mar. 8, 1965, for plows, which application is now abandoned. The present invention relates generally to plows, and particularly to two-way plows which are operated by farm tractors and the like.

To quickly and efficiently plow a given field or farm acreage, it has been found desirable to employ two-way plows. The usual action of a farm plow is such that as the plow is pulled or pushed through the ground, the ground is turned over in one direction, that is, to either the right or the left of the plow itself. However, since an entire field is plowed by making a succession of passes or trips across the land in opposite directions, if only a single set of plow bottoms is employed the ground is thrown or turned in opposite directions with each succeeding trip across the field. That is, the ground is turned over to either the right or the left in accordance with the construction of the plow bottoms as right-handed or left-handed. If, for example, such turning action is to the right of the plow and tractor, after the tractor and plow have been turned around at the far end of the field and pulled in the opposite direction, the turning or plowing action of the plow bottoms in the ground is still to the right of the tractor and plow but, with respect to the field itself, such turning action is now in the opposite direction from the action obtained on the preceding pass. This, of course, is very undesirable in that many dead furrows are thereby formed in the field.

In order to prevent the formation of such furrows when only a single set of plow bottoms is employed, it is necessary for the tractor and plow to make relatively long trips along the opposite sides or ends of the field. This results in a considerable loss in time and effort, thereby making the plowing operation unduly expensive.

To alleviate the above shortcomings, double acting or two-way plows have been originated whereby both left-handed and right-handed plow bottoms are provided in a single plow so that the left-hand bottoms are used whenever a pass is being made in one direction across the field and the right-hand bottoms are used in plowing in the opposite direction. Under these circumstances, the ground is always being turned or thrown in the same direction with respect to the field itself. This, it will be noted, is obtained without the necessity of long non-productive trips along the edges or sides of the field.

Two-way plows have been available for some period of time, and generally comprise a rotatable shaft which extends longitudinally and rearwardly of the tractor. The various sets of plow bottoms (one set of left-hand and one set of right-hand bottoms) are secured to and along such shaft on opposite sides thereof, or in other words, displaced by approximately 180°. Thus, by rotating the shaft, the different sets of plow bottoms can be alternately used in accordance with the direction of plowing across the field.

It has been found that the forces created by the interaction of the plow bottoms and the ground itself creates an upward force on the plow, urging the shaft to rotate. Thus, the need has arisen for locking means whereby the plow can be locked in a given operating position against the force of the ground during the plowing operation.

Although the plow bottoms must be in predetermined vertical position in order to perform the proper plowing operation, the tractor to which such plow is attached may not be in a corresponding level position. That is, it frequently occurs that one wheel of the tractor is positioned within a furrow, thereby putting the tractor at an angle to the horizontal.

To enable the plow itself to be adjusted as desired, so that the plow bottoms are always in the proper position relative to the ground, the need for adjustable locking means has become apparent. That is, since the locking means in opposition to the ground force on the plow bottoms determines the position of the plow relative to the tractor, the locking means should be adjustable so that such relationship can be changed as desired. With this arrangement, proper adjustments can be made for maintaining the plow in proper relation to the surface of the ground, regardless of the relative position of the tractor pulling such plow.

It has also been found desirable to employ hydraulic actuating means for quickly and easily changing from one set of plow bottoms to another. However, such prior hydraulic actuating means have been so related to the plow mechanism that any movement of the latter has worked against the fully extended or contracted hydraulic actuator. That is, with the hydraulic ram in either of its extended or contracted positions it is internally pressurized and thus acts as a solid structural member. Any forces acting against the ram at this time can be destructive to some of the braces or frame members.

An object of the present invention is to provide, in a two-way plow, means whereby the plow is firmly locked in either of its two operating positions.

Another object of the present invention is to provide locking means as characterized above which are automatically released as the plow is raised or lifted out of the ground to enable the operator to quickly and easily change from one set of plow bottoms to another.

A further object of the present invention is to provide locking means as characterized above which are adjustable so that the plow bottoms can be maintained in proper relation to the ground, regardless of the position of the tractor or other motive power means employed therewith.

A further object of the present invention is to provide locking means as characterized above which are virtually fool-proof in operation due to automatic setting and releasing thereof.

Another further object of the present invention is to provide a two-way plow having hydraulic actuating means for changing from one set of plow bottoms to another, and wherein each of such sets of plow bottoms can be adjusted as to operating position in the ground without causing a force to thereby be created between the hydraulic means and the plow mechanism itself.

Another further object of the present invention is to provide a two-way plow having double acting hydraulic actuating means as characterized above having connection means between the hydraulic actuator and the rotatable plow assembly such that the plow assembly can be adjusted at either of its extreme positions without affecting the hydraulic actuator.

Another further object of the present invention is to provide in a two-way plow as characterized above having hydraulic actuating means for changing from one set of plow bottoms to another, and wherein adjustable locking means is employed as characterized above for adjustably defining the operating positions for the various sets of plow bottom, the adjustment feature permitting repositioning of the several sets of plow bottoms without interfering with or working against the hydraulic actuator.

An even further object of the present invention is to provide locking means, hydraulic actuating means and the combination of such locking and hydraulic actuating means as characterized above, which are simple and inexpensive to manufacture, and rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 3 is a fragmentary front elevational view of such plow, shown in its other operating position;

FIGURE 4 is a fragmentary side elevational view of such plow;

FIGURE 5 is a fragmentary perspective view of locking means according to the present invention;

FIGURE 6 is a sectional view taken substantially along line 6—6 of FIGURE 5 of the drawings;

FIGURE 7 is a sectional view taken substantially along line 7—7 of FIGURE 6;

FIGURE 8 is a diagrammatic view of the relationship between the hydraulic actuator and other parts of the plow; and FIGURE 9 is a diagrammatic view similar to FIGURE 8 but wherein the various parts are in their opposite operating positions;

FIGURE 10 is a front elevational view of a second embodiment of the present invention;

FIGURE 11 is a side elevational view of the second embodiment shown in FIGURE 10;

FIGURE 12 is a horizontal sectional view, taken substantially along line 12—12 of FIGURE 10;

FIGURE 13 is a fragmentary front elevational view of the second embodiment, shown in one extreme operating position; and FIGURE 14 is a fragmentary rear elevational view, taken substantially along line 14—14 of FIGURE 11.

Like reference characters indicate corresponding parts throughout the several views of the drawings.

Figure 1:
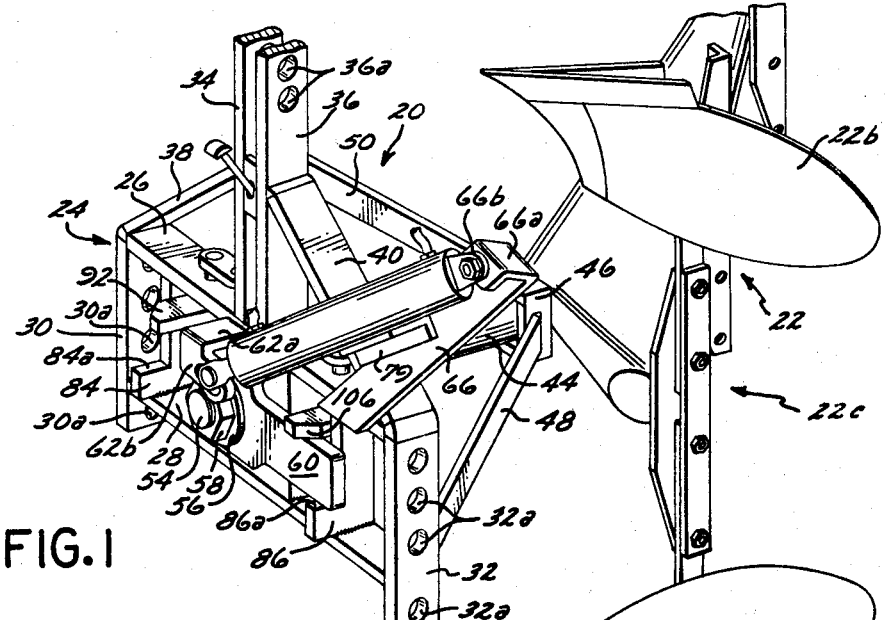
FIGURE 1 is a fragmentary perspective view of a two-way plow according to the invention.

Referring to FIGURE 1 of the drawings, there is shown therein a plow identified generally with the numeral 20 and comprising a plow assembly 22 carried by a frame 24. As will hereinafter become more readily apparent, the particular style or construction of the plow assembly 22 and frame 24 does not constitute a limitation on the invention. That is, substantially any type of two-way plow assembly which is rotated from one position to another relative to a supporting frame is usuable for successful practice of the present invention.

The frame 24 shown in the drawings is of conventional construction and design and is commonly referred to as an A-frame for reasons which are believed to be readily apparent. Such frame is formed of steel and comprises two generally horizontal support members or braces 26 and 28 which are held in spaced relation by end support members 30 and 32. Such end support members are individually provided with a series of through openings, as at 30a and 32a respectively, which are aligned for connection individually to a pair of links (not shown) as will hereinafter be explained. As will be readily apparent to those persons skilled in the art, the A-frame is formed of relatively heavy steel members welded together to provide a structure capable of carrying considerable weight and withstanding relatively large forces.

Extending upwardly from the upper horizontal support member 26 and secured thereto by welding or the like, is a pair of narrowly spaced standards 34 and 36 formed with aligned through openings as shown at 36a in FIGURES 1 and 4.

A pair of angularly disposed support members 38 and 40 extend from the upper ends of the end members 30 and 32 to an intermediate point on the respective vertically disposed standards 34 and 36. As shown in the drawings, all of these members are firmly welded together to provide a very rigid structure.

The A-frame thus described is secured to a tractor (not shown) or other motive power means for pulling the plow 20 through the earth or ground as will hereinafter be explained. Such A-frame 24 affords what is commonly referred to as a three-point hitch, there being a pair of lower links extending from the tractor to the oppositely disposed end members 30 and 32, and an upper link 39 which extends from the tractor to a position between the vertically disposed standards 34 and 36. As will be readily apparent to those persons skilled in the art, the three links, as described, are attached to the frame 24 by suitable fastening pins or bolts extending through suitable openings in such links and end members or standards. A series of openings is provided in such members of frame 24 to permit of adjusting the A-frame with respect to the tractor in a vertical direction.

Firmly secured between the horizontal support members 26 and 28 is a mounting block 42, the upper and lower edges of which are welded to the said members 26 and 28. Such mounting block 42 is formed with a through opening wherein a hardened bushing (not shown) is secured.

A universal connection (not shown in detail) which carries an elongated shaft 44 is mounted in such bushing, and a bearing member 46 spaced a fixed distance from the A-frame 24 is held in fixed position relative thereto by supporting links 48, 50 and 52. Such universal connection comprises a relatively large cylindrical bearing member (not shown) which fits within the bushing in mounting block 42. A generally square journal or mounting portion is formed adjacent said cylindrical bearing portion and extends beyond the mounting block 42. A shaft 54 formed with fastening threads for receiving a washer 56 and nut 58 is provided adjacent the square mounting portion. Such bearing member mounting portion and threaded shaft 54 are formed integrally, as will be apparent to those persons skilled in the art.

The rotatable shaft 44 which extends rearwardly of the A-frame 24 carries the plow assembly 22, including the plow bottoms 22a and 22b for use in plowing in opposite directions as above explained. Suitable rigid mounting means as shown at 22c is provided for securing the plow bottoms 22a and 22b relative to the shaft 44.

The plow bottoms are provided individually or in sets of two or more up to six depending upon the power of the tractor being used. The most significant characteristic, however, of such plow bottoms 22a and 22b is that they are disposed or shaped in opposite directions such that they will turn over the ground in opposite directions with respect to the tractor or plow 20. This, as above explained, enables the two-way plow to be used on adjacent trips or passes across a field without causing dead furrows to remain.

Positioned on the square journal, and held thereon by washer 56 and nut 58, is a force-transmitting member 60 having a mounting portion 62 and an extension or arm 64. As shown in the drawings, the mounting portion 62 and arm 64 may be formed integrally since they operate together, or they may be formed separately, if desired, and positioned in side-by-side relation on the square journal.

For reasons which will hereinafter become more apparent, the force-transmitting member 60 is formed with a main body portion 60a having a square through opening (not shown) for firmly and non-rotatably fitting over the aforementioned journal. The arm 64 may be an extension of said main body 60a to be disposed as shown in the drawings. The mounting portion 62, however, must be so formed as to extend beyond the end of threaded shaft 54. Thus, as shown most clearly in FIGURE 1 of the drawings, an extension 62a is provided laterally of the main body 60a so that an inward radial extension 62b will be positioned beyond the end of shaft 54. Thus, the mounting portion is formed integrally with main body 60a, forming a substantially U-shape therewith. It is well within the scope and intent of the present invention, the mounting portion 62 may be formed separate and apart from the main body 60a and subsequently attached thereto to extend beyond the end of shaft 54.

In the event means is devised which does not require the member 60 to rotate approximately 180°, the mounting portion 62 need not extend beyond shaft 54. In this regard, it is contemplated that suitable transmission means such as gears or the like may be used which would greatly decrease the angular movement of force transmitting member 60.

Firmly secured to horizontal support member 26 of A-frame 24 is an anchor or support member 66. Such member 66, as shown most clearly in FIGURE 1, is provided with a reversely bent or U-shaped end portion 66a providing a depending lip 66b to which is attached one end of a hydraulic ram or actuator 68. Such lip is formed with a through opening for receiving fastening means such as nut and bolt 74 which also engage a mounting tab or lug 72 at the rear of actuator 68.

Actuator 68 comprises a cylinder 70 wherein a piston (not shown) is slidably positioned. Such piston is attached to a piston rod, the free end of which carries a bifurcated pivot connector or clevis 78.

A bracket 79 may be secured to frame 24 as by welding or the like to provide a ledge or platform engageable by actuator 68 to prevent the latter from being positioned on or below the center line between shaft 54 and nut and blot 74, as will hereinafter become apparent.

Mounting portion 62 of member 60 is formed with a generally elliptical through opening 80. A pin 82 loosely fits within such through opening, and is attached to both sides of the clevis 78. It should be noted that the elliptically shaped opening 80 in mounting portion 62 is substantially larger than the cross section of pin 82, thereby affording considerable freedom of movement between pin 82 and force-transmitting member 60.

Firmly secured between the horizontal support members 26 and 28 is a pair of spaced stop members 84 and 86. As shown most clearly in FIGURE 1 of the drawings, such stop members are generally L-shaped and are secured to the horizontal members as by welding or other permanent connection means. The L-shaped configuration affords a substantially horizontal ledge or shoulder for each stop member 84 and 86 as at 84a and 86a respectively. Such shoulders are engageable by the rotatable arm 64 of force-transmitting member 60 to provide a limit stop therefor as will hereinafter be described.

Adjustable locking means is provided to retain the respecitve set of plow bottoms in their operating positions. Such means comprises two substantially identical structures, one at each of the stop members 84 and 86. The locking means adjacent stop member 84 comprises a tubular member or sleeve 88 wherein a pivotal shaft 90 is positioned. The lower end 90a of shaft 90 is provided with fastening threads to receive an adjustable lock nut or thrust member 91.

A locking element 92 is welded to the pivotal shaft 90 intermediate the ends thereof to be movable therewith as shown most clearly in FIGURE 5 of the drawings.

Horizontal support member 26 is formed with a through opening 26a through which the upper end portion 90c of shaft 90 extends. As shown most clearly in FIGURE 5 of the drawings, such end portion 90c has an operating lever 94 firmly secured thereto as by welding or the like.

The locking means adjacent stop member 86 comprises a cylindrically shaped sleeve 96 wherein a pivotal shaft 98 is positioned. The lower end of such shaft, as shown most clearly in FIGURE 6, is formed with fastening threads as at 98a for receiving adjustable lock nut or thrust nut 100.

As shown most clearly in FIGURE 7 of the drawings, the nut 100, as well as nut 91, is split or cut along a radial line to provide a small gap 102. Such gap is bridged by a lock screw 104 which permits nut 100 to be rigidly secured to shaft 98. In this manner, and as will hereinafter be explained in greater detail, the position of nut 100 on shaft 98 can be varied as desired and thereafter secured in place so as to be substantially immovable. The nut 91 on shaft 90, of course, is adjustable in the same manner.

A locking element 106 is welded to the shaft 98 intermediate the ends of the latter. A through opening 26b formed in horizontal support member 26 permits the upper end portion 98b of shaft 98 to extend therethrough. An operating lever 108 is firmly attached to the upper end of shaft 98 for operation of the locking element 106 as will hereinafter be described.

A pair of sleeves or bearing members 110 and 112 are secured to the rear edge or surface of horizontal plate 26. Within such bearing members there is positioned a shaft 114 for rotation about a horizontal axis. The opposite ends of shaft 114 are provided with operating levers 116 and 118 respectively. A connecting link 120 which is formed with a pair of right angle bends, as shown in FIGURE 5, is inserted into through openings in each of the operating levers 94 and 116. In like fashion, a link 122 having similar right angle bends is provided in suitable openings in the levers 108 and 118.

It is thus seen that rotation of shaft 114 causes corresponding interaction of lever 116, link 120 and lever 94 on one side to rotate shaft 90 and locking element 92, and similar interaction of lever 118, line 122 and lever 108 on the other side for rotation of shaft 98 and locking element 106.

To effect rotation of shaft 114, there is provided between standards 34 and 36 a generally reciprocatable lever 124. Such lever slidably extends through an opening in a mounting plate 126 fastened between the standards. A pair of upstanding arms 128 and 130 are welded to shaft 114 as shown in FIGURE 5, the lower end 124a of reciprocatable lever 124 being pivotally fastened between such arms by a pivot pin or bolt 132. To provide the desired adjustability, as will hereinafter become more apparent, the lower end 124a of lever 124 is provided with a series of holes or through openings 124b.

As shown most clearly in FIGURE 4 of the drawings, the upper end of lever 124 is formed with a head 124c having a generally arcuate upper surface to be engaged by the aforedescribed upper link 39 which interconnects the tractor and the upper portion of the A-frame 24. For reasons which will hereinafter be described in detail, the lever 124 is engaged by the link 39 whenever the A-frame 24 is raised a predetermined distance necessary to remove the plow bottom from the earth or ground. Such engagement of link 39 and lever 124 results from the fact that as A-frame 24 is raised, the lower included angle between the link 39 and the A-frame becomes smaller until the link 29 actually engages the head 124c and depresses lever 124. A tension spring 134 is connected between pivot pin 132 and one of the standards 34 and 36 of frame 24 to urge shaft 114 in a given rotational direction as will hereinafter appear.

It is also contemplated within the scope of the present invention that other types of locking elements may be employed for operation in response to actuation of lever 124. For instance, the locking elements 92 and 106 instead of being pivotal into and out of their locking positions could be reciprocatable between such positions in response to rotation of shaft 114. Such reciprocatable elements would be slidably mounted in suitable sleeves, and attached to actuating links or levers associated with shaft 114.

In this regard, it is contemplated that the arm 64 could be constructed in two portions, one on either side of the pivot shaft 54. Thus, a pair of double acting locking members could be provided at one location on frame 24 to receive and retain one or the other portions of said arm 64, depending on the particular set of plow bottoms being used.

The operation of the mechanism shown in FIGURES 1–9, inclusive, and as described above is substantially as follows.

Figure 2:
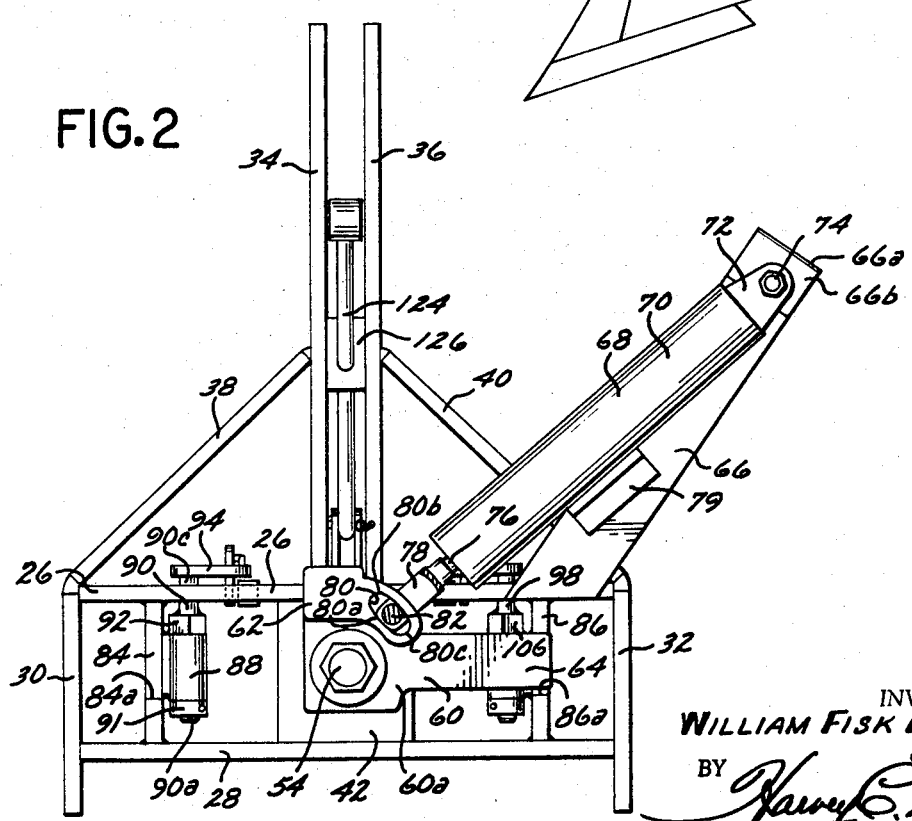
FIGURE 2 is a front elevational view of the two-way plow of FIGURE 1, shown in one operating position.

With the mechanism in the position shown in FIGURE 2, one of the two sets of plow bottoms is positioned within the ground and is exerting an upward force on the locking element 106. That is, as viewed in this drawing, the arm 64 has been rotated in a counterclockwise direction by the ground force into engagement with locking element 106. Thus the given set of plow bottoms are caused to turn over the ground in a given direction as the tractor pulls the plow through the ground or earth.

When the plow and tractor reach the other end of the field, the plow assembly 22 is removed from the soil or ground before the entire unit is turned around to make the next trip or pass over the field. Such removal of the plow assembly is effected by raising the A-frame 24 by means of the conventional hydraulic lifting apparatus for that purpose. Further, and more importantly for the present invention, such lifting motion of frame 24 causes the upper link 39 to engage lever 124, as above explained, to move the latter downwardly.

As viewed in FIGURE 5, the shaft 114 is thus rotated within the bearing members 110 and 112 to cause the links 120 and 122 to pull the levers 94 and 108 rearwardly, thus causing the locking elements 92 and 106 to be pivoted toward each other to positions beneath the horizontal support member 26.

When this occurs, the plow assembly 22 is free to rotate due to removal of the locking element 106 from interference with the arm 64. The operator of the plow then actuates the hydraulic actuator 68 by means of suitable controls (not shown) for that purpose, whereby the plow assembly and force-transmitting member 60 are rotated until the arm 64 engages the stop shoulder 84a of stop member 84 as shown in FIGURE 3 of the drawings.

As above explained, this causes the other set of plow bottoms to be downwardly disposed for subsequent engagement with the ground.

The A-frame 24 is then lowered, thereby causing upper link 39 to be disengaged from the lever 124. When this occurs, the tension spring 134, as shown in FIGURES 4 and 5, returns the lever 124 to its extended position and rotates shaft 114 such as to move the locking elements 92 and 106 to their locking positions as shown in FIGURES 3 and 5. Thus the locking element 92 is caused to be disposed over the arm 64 to prevent clockwise rotation thereof as viewed in FIGURE 3.

Such positioning of locking element 92 occurs during the lowering operation of the plow assembly 22, immediately prior to engagement of the ground by the then operable set of plow bottoms. When the tractor moves forward, such plow bottoms dig into the ground causing the upward force to be applied to the plow assembly and the arm 64. This force causes the arm to be lifted from the stop shoulder 84a and moved into firm engagement with locking element 92. As above described with respect to the locking mechanism at stop member 86, the locking element 92 is adjustable by means of lock nut 91 to control the amount of such return movement of the plow assembly following engagement of the latter with the ground.

The new set of plow bottoms now turns the ground over into the furrow formed during the preceding trip or pass across the field. Thus by repeating this procedure, all of the passes across the field cause the dirt to be thrown in the same direction relative to the field itself.

At the opposite end of the field, the above procedure is repeated, thereby causing the original plow bottoms to be put in operation, the locking element 92 being automatically released upon raising of the A-frame 24, and the element 106 being automatically activated upon lowering thereof.

One of the principal features of the present invention is the use of an elliptical opening 80 in mounting portion 62 for cooperation with the substantially smaller pin 82. As a result of this arrangement the following operation is obtained.

As shown in FIGURE 2, a condition is obtained wherein the pin 82 is positioned substantially in the center of the elliptical opening 80, and the hydraulic actuator 68 is in its contracted condition. In this regard, it should be realized that actuator 68 is a double-acting hydraulic ram wherein pressure is alternatively applied to one side or the other of the piston therein to cause the piston rod to be moved accordingly. When such piston reaches either of its extreme positions, wherein the actuator is fully expanded or fully contracted, the hydraulic pressure applied to the piston is absorbed by the cylinder 70. Such fluid pressure is not changed until suitable valves are manipulated by the operator when it is desired to change from one set of plow bottoms to the other.

With the hydraulic actuator 68 associated with the force transmitting member 60 as shown in FIGURE 2, and with the A-frame 24 in its raised position so as to release the locking elements 92 and 106 as above explained, application of fluid pressure to actuator 68 causes the latter to extend the piston rod 76. This moves the pin 82 into engagement with the side 80a of the opening 80, the pin being slightly removed from the center line between the shaft 54 and the mounting bolt 74. The force-transmitting member 60 is thus caused to rotate in a counterclockwise direction. During the initial movement of member 60, the pin 82 progressively moves in the elliptical opening 80 until it reaches the end 80b thereof.

Continued actuation of hydraulic ram 68 causes further rotation of member 60 and plow assembly 22.

After the mechanism has been rotated approximately 90°, it has been discovered, the weight of the plow assembly 22 takes over and falls toward its next extreme position wherein arm 64 is in engagement with stop shoulder 84a. During such rotational movement, the plow assembly itself provides the moving force, and the hydraulic actuator 68 acts to retard such movement.

As shown diagrammatically in FIGURE 8, when the arm 64 engages the stop shoulder 84a the elliptical slot or opening 80 has changed its relative position to pin 82, the latter now being adjacent end 80c of such opening as shown in solid lines. This, of course, is due to the fact that the weight of the plow assembly has pulled the force-transmitting member 60 faster than the actuator 68 has pushed it.

After such operation, the A-frame 24 is lowered putting the locking element 92 into a position over the arm 64.

When the plow bottoms dig into the ground, the arm 64, as above explained, is return-rotated into engagement with stop element 92, as indicated by the dotted line showing of arm 64 in FIGURE 8. At the same time, the force-transmitting member 60 is return-rotated correspondingly until the opening 80, as shown in dotted lines in FIGURE 8, is positioned such that the pin 82 is approximately in the center thereof. As also shown in this diagram, the pin 82 is thus caused to stop short of the center line through the shaft 54 and mounting screw 74.

A particularly beneficial result of this arrangement is that any force which tries to roll the plow assembly out of the ground is absorbed entirely by the locking element 92 rather than by the hydraulic actuator 68. This is obtained by virtue of the fact that the hydraulic actuator remains in its extended position even though the entire rotating mechanism has been rotated a predetermined distance in a rearward direction.

As shown diagramatically in FIGURE 9, when actuator 68 is operated to its contracted position, the pin 82 again does not meet the center line between the shaft 54 and the mounting nut 74. Also, the weight of the plow assembly again predominates following approximately 90° of rotation from the position shown in FIGURE 3. As a result, the pin 82 is at the end 80b of the elliptical opening 80 with the arm 64 firmly engaging the stop shoulder 86a. Thereafter, when the plow bottoms engage the ground, the arm 64 is backed into engagement with the stop element 106 and the force-transmitting member 60 is repositioned such that the pin 82 is substantially in the center of opening 80. The hydraulic acuator 68 is in its fully contracted condition so that all of the forces tending to roll the plow bottom out of the ground are absorbed by the locking element 106.

Referring to FIGURE 10 of the drawings, there is shown therein a second embodiment 200 for illustration of the present invention. This embodiment comprises many of the structural members and other components shown in FIGURES 1-9, and hence are identified with the same reference characters. For instance, the embodiment 200 shown in FIGURE 10 comprises an A-frame 24 having horizontal support members 26 and 28 as well as end support members 30 and 32. The latter member is substantially identical to the end support member 32 of the first embodiment, although it extends above the horizontal member 26 as shown most clearly in FIGURES 10, 13 and 14. The embodiment 200 further comprises a pair of narrowly spaced standards 34 and 36 secured to horizontal support member 26. A pair of angularly disposed support members 38 and 40 complete the A-frame 24, similar to the A-frame of the first embodiment.

A stop member 202 is welded between the horizontal members 26 and 28 as shown in FIGURES 10, 13 and 14. A vertical support member 204 is provided opposite the member 202 to provide additional strength to the frame.

Stop member 202 is provided with a pair of oppositely disposed stop shoulders as shown at 202a and 202b. Such shoulders extend outwardly from the main body of the support member to engage a rotatable force-transmitting member as will hereinafter be described.

As shown most clearly in FIGURE 12 of the drawings, a centrally located shaft 206, on the order of shaft 54 of the first embodiment, is provided on the A-frame 24. Such shaft extends rearwardly of the A-frame and carries a plow assembly as shown at 22 in FIGURE 1 of the drawings. Such shaft, of course, is supported by suitable support members as shown in the first embodiment.

Shaft 206 may be reduced as at 206a where it is journaled within the A-frame. Immediately adjacent such reduced portion 206a, the shaft is formed with a substantially square cross sectional area 206b and an end portion 206c is provided with suitable fastening threads.

The square cross sectional area 206b receives a bearing member 208 having a complementary formed through opening and firmly secured to shaft 206 as by welding. Also positionable on such square cross sectional area for rotation with shaft 206 is a movable stop member or force-transmitting member 210.

A disk 212 is positioned on shaft 206 at the threaded end portion 206c. A lock nut 214, which may take substantially any desired form, is threadedly positioned on the end 206c to retain the various components in assembled relation. Said lock nut may be an annular member having a centrally located threaded opening and formed with a radial slot 214a. An adjustment screw 216 is provided across such slot to enable the lock nut to firmly grip the end 206c of shaft 206. Thus, nut 214 can be employed to retain disk 212 on shaft 206 while permitting relative movement there between as will hereinafter be explained.

Force-transmitting member 210, as above mentioned, is provided with a generally square through opening for non-rotatable attachment to the square cross sectional area 206b of shaft 206. Such member 210 is provided with a generally U-shape configuration as shown in FIGURES 10 and 13, and is provided with oppositely disposed tubular end portions 210a and 210b. Each such tubular end portion is formed with internal fastening threads for receiving an adjustment bolt 218 and 220 respectively. Suitable lock nuts 222 and 224 are threadedly mounted on the bolts 218 and 220, respectively.

As shown in the drawings, the tubular end portions 210a and 210b of member 210 may be separate tubular members welded to the member 210 or they may be formed integrally therewith, as desired.

Each of the adjustment bolts 218 and 220 is provided with an abutment end portion as shown at 218a and 220a, respectively. Such end portions are engageable with the stop shoulders on members 202, as will hereinafter be explained in greater detail.

A pair of connecting pins 226 and 228 are firmly secured to the force-transmitting member 210 as by welding, brazing or the like. Such pins are shown in FIGURES 10, 12, 13 and 14 and extend forwardly of the A-frame 24 to engage suitable arcuate slots 212a and 212b.

The slots 212a and 212b extend approximately 90° of the disk 212 as shown in the drawings. Thus, as the disk 212 is rotated, as will hereinafter be explained, the force-transmitting member 210 is rotated accordingly. It should be realized that the present invention contemplates that disk 212 may be formed with only one arcuate slot and that the force-transmitting member 210 may be provided with only one connection pin such as shown at 226 and 228. This will be apparent as the operation of the second embodiment is hereinafter described. However, for optimum operation, it is desirable to have the forces about shaft 206 balanced. As such, it is most desirable to have diametrically oppositely located pins to accomplish this.

An actuating cylinder 230 is provided for moving disk 212 between the various positions.

A frame 234 for supporting cylinder 230 as well as an additional hydraulic cylinder 232 is provided. Such frame comprises a pair of angularly disposed support members 236 and 238 secured to the A-frame, and a lateral member 240 welded thereto. The lateral member is provided with a pair of end members 242 and 244, each of which is formed with a through opening for receiving a fastening pin which extends through a clevis on the end of the respective hydraulic cylinder.

It is thus seen that the cylinder 230 is firmly anchored to the frame 234. The piston rod 230a of cylinder 230 is provided with a clevis 246 which receives a mounting pin 248. The latter pin also extends through a suitable opening in a bracket 250 which is formed with an offset end portion 250a welded to disk 212 as shown in FIGURES 10, 11 and 13.

Cylinder 230, of course, is provided with a piston (not shown) as well as suitable conduits 230b and 230c for conducting hydraulic fluid to and from such cylinder. It is thus seen that by suitable manipulation of valves (not shown) associated with these conduits, the piston and piston rod 230a can be caused to move in opposite directions.

The cylinder 232 on the opposite side of A-frame 24 is connected to the shaft 206 by means including a pair of arcuate plates 252 and 254. Each such plate is welded to shaft 206 as shown in FIGURES 11 and 14, and is provided with an arcuate slot as shown at 252a with respect to member 252. Each such slot extends approximately 90° for operation as will hereinafter be described. A clevis 256 is attached to the end of a piston rod 232a of cylinder 232, and a pin 258 extends through such clevis as well as the arcuate slots in the members 252 and 254.

The cylinder 232, for purposes which will hereinafter be explained in detail, is of the reverse bleed type and is provided with a reducer (not shown) which is operable to prevent rapid movement of the piston (not shown) therewithin. Such reducer may take any one of several forms, and in its simplest construction may be a small bleed port which permits fluid to flow therethrough at a predetermined slow rate. In this regard, cylinder 232 may have a closed hydraulic system associated therewith such that as the piston thereof is moved, fluid is forced from one side of the piston to the other through suitable external conduits, the reducer being operable in such external system to control the rate of flow of hydraulic fluid.

Due to the different cross sectional areas occupied by the hydraulic fluid on opposite sides of the piston of cylinder 232, an accumulator may be employed therewith. That is, the cylinder 232 shown in the drawings comprises a piston rod 232a which extends through only one end of the cylinder end wall. Thus, that side of the cylinder has a reduced cross sectional area to be occupied by fluid, its reduction being equal to the cross section of the piston rod. As a result of this, as the hydraulic fluid is forced from one end of the cylinder to the other through the external conduits, an excess or insufficiency of fluid results depending upon the direction of flow of the fluid.

An accumulator merely acts as a reservoir to take up the excess hydraulic fluid when necessary and to afford additional fluid to the external circuit when this function is required. One form of accumulator comprises a movable piston, one side of which is exposed to the hydraulic fluid in the external circuit while the other side thereof is exposed to a pressure of approximately 50 to 75 pounds per square inch. Such pressure may be afforded by nitrogen or other gas which will not react with the hydraulic fluid. For instance, air has been found undesirable for providing this pressure since it causes the hydraulic fluid to emulsify.

An alternative to the use of an accumulator as above described, is the use of a piston rod in cylinder 232 which extends the entire length of the cylinder, through both walls thereof. Under these circumstances, the cross sectional areas of the cylinder on opposite sides of the piston are substantially equal, thus eliminating the need for the function of the above described accumulator. However, under certain applications, it may be deemed undesirable to have a nonworking piston rod extending from one end of the cylinder.

As shown most clearly in FIGURES 10 and 13, a double-acting locking mechanism 260 is provided on the A-frame. Such locking mechanism comprises a pair of mounting tabs 262 and 264 firmly secured to frame 24 as by welding or the like. A pivot pin 266 extends through suitable openings in said mounting tabs and is provided with fastening nuts 268 on either end thereof. Intermediate the tabs 262 and 264 is a cylinder 270 which carries locking members 272 and 274. The latter members may be attached to the cylinder 270 as by welding or the like to be rotatable therewith on shaft 266 as will hereinafter be explained.

The actuating means shown in FIGURE 5 of the drawings and hereinabove described is operable in response to movement of shaft 124 to thereby effect rotation of cylinder 270 and locking members 272 and 274. Thus when A-frame 24 is raised and lowered, the cylinder 270 and locking members 272 and 274 are rotated accordingly.

The embodiment shown in FIGURES 10-14, inclusive operates generally as follows.

With the mechanism in the position shown in FIGURE 10 of the drawings, one set of plow bottoms is in operating position. The locking members 272 and 274 are in their locked position, the member 274 thereby holding the end portion 210a of force-transmitting member 210 in fixed position against the shoulder 202b of locking member 202.

When it is desired to rotate the plow to employ the other set of plow bottoms, it is merely necessary to raise the A-frame so as to cause rectilinear movement of shaft 124. This causes rotation of locking member 274 out of its position of interference with bolt 218. This operation is as above described with respect to the first embodiment.

Thereafter, it is a simple matter to actuate a suitable valve (either manually or automatically) to effect extension of piston rod 230a of cylinder 230.

Such actuation of cylinder 230 causes disk 212 to be rotated approximately 90° counterclockwise from the position shown in FIGURE 10 to the position shown in FIGURE 13. This causes corresponding rotation of force-transmitting member 210 and corresponding movement of the plow on the end of shaft 206.

It should be noted that the arcuate members 252 and 254 are so oriented with respect to disk 212 on shaft 206 that throughout such 90° movement of disk 212, the arcuate members 252 and 254 are caused to move without creating any force whatever on piston rod 232a of cylinder 232. That is, the position of arcuate member 252 as shown in FIGURE 14 corresponds to the position of disk 212 shown in FIGURE 10.

The aforedescribed 90° movement of force-transmitting member 210 with disk 212 is accomplished by virtue of engagement of the pins 226 and 228 with the disk 212. When, however, the disk 212 and member 210 have been thus rotated, the weight of the plow becomes such as to carry the plow assembly the remaining 90° required to cause the other of said plow bottoms to be in operating position. Such movement under the force of gravity does take place, but under the control of cylinder 232.

The initial 90° rotation of shaft 206 brings the arcuate members 252 and 254 into engagement with the pin 258 associated with cylinder 232. Thereafter, further rotation of shaft 206 is accomplished against the retarding force of cylinder 232. Also, such second 90° movement of shaft 206 is accomplished without corresponding rotation of disk 212 and without further actuation of cylinder 230.

The aforedescribed retarding effect produced by the reducer in the hydraulic circuit associated with cylinder 232 causes the second 90° movement to be at a relatively slow rate of speed. Thus, the plow is gently lowered into its second operating position without causing undue force on the various elements.

As will be readily understood, the reverse movement is accomplished in like manner, since the above described second 90° rotation of shaft 206 causes the pins 226 and 228 to be rotated with member 210 to the opposite end of the respective arcuate slots 212a and 214b. Thus, when disk 212 engages pins 226 and 228 to effect return movement of the plow assembly, the rear arcuate members 252 and 254 are out of engagement with pin 258. Conversely, when the pin 258 is in engagement with the arcuate members 252 and 254 so as to retard the movement of the plow assembly, the disk 212 remains stationary while the pins 226 and 228 are moved to the opposite ends of the respective arcuate slots.

When the force transmitting member 210 reaches its opposite position as shown in FIGURE 13, adjustment bolt 220 is caused to engage shoulder 202a. Thereafter, lowering of the A-frame causes the actuating means of FIGURE 5 of the drawings to move locking member 272 into its locking position as shown in FIGURE 13. The second set of plow bottoms is thus in position to operate as desired, any reverse movement thereon being counteracted by the locking member 272.

As will be readily apparent to those persons skilled in the art, substantially any type of lost-motion connection may be provided between disk 212 and member 210 as well as between piston rod 232a of cylinder 232 and the shaft 206. For instance, suitable lugs may be provided on disk 212 and on one or both of the arcuate members 252 and 254 to be engaged by the respective pin or pins at the proper time to effect the desired 90° rotation. All such arrangements are deemed equivalent to the means shown in the drawings and hence are within the scope of the present invention.

A particularly desirable feature of the locking means shown in the drawings and herein before described, is that they can be adjusted to maintain the plow bottoms in proper relation to the surface of the ground, regardless of the position of the tractor with respect thereto. That is, in the event one wheel of the tractor is positioned in a furrow, such tractor will be at a substantial angle to the horizontal or ground level. Under these conditions, it is a simple matter for the operator to reposition the appropriate one of the lock or thrust nuts 91 and 100 on the respective pivot shaft 90 and 90 to permit the arm 64 and plow assembly 22 to rotate the desired return before engaging the respective one of such stop elements. Thus, although the tractor is at a considerable angle to the horizontal, the plow bottoms themselves are positioned properly.

It is thus seen that the present invention provides a plow having many unique features whereby the two-way plow can be firmly locked in either of its two operating positions and can be operated by hydraulic means from one to another of such positions. Also, this invention affords adjustability whereby the position of the plow bottoms can be maintained with respect to the soil or ground irrespective of the position of the tractor pulling the same.

Although I have shown and described certain specific embodiments of my invention, I am fully aware that many modifications thereof are possible. My invention, therefore, is not to be restricted except insofar as in necessitated by the prior art and by the spirit of the appended claims.

I claim:

1. In a two-way plow having a frame mounted relative to a tractor or the like and a plow assembly rotatably mounted on said frame, the combination of, a shaft mounted for rotation on said frame and carrying said plow assembly for rotation between two extreme operating positions, a force-transmitting member fixed to said shaft for rotation with said plow assembly, relatively stationary stop means having a pair of abutments alternatively engageable by said force-transmitting member upon reverse rotation of said shaft for approximately 180° to define said extreme operating positions, lock means for retaining said force-transmitting member in engagement with either of said abutments, an actuating member rotatably mounted on said shaft having rotational movement relative to said shaft, a hydraulic actuator operable to effect reverse rotation of said actuating member but only for substantially 90°, lost motion connection between said actuating member and said force-transmitting member to cause the former to rotate the latter the initial 90° in moving said assembly from one extreme position to the other and thereafter to effect disconnection thereof, a reverse bleed hydraulic cylinder, at least one connecting member fixed relative to said shaft for rotation therewith, and a lost motion connection between said connecting member and said hydraulic cylinder to effect disconnection thereof until the last 90° rotation of said shatt in rotating said plow assembly 180° from one operating position to another, whereby said hydraulic actuator initially rotates said plow assembly while said hydraulic cylinder is inoperative and thereafter said hydraulic cylinder retards the speed of further rotation thereof under the force of gravity while said actuator is inoperative.

2. In a two-way plow having a frame mounted relative to a tractor or the like and a plow assembly rotatably mounted on said frame, the combination according to claim 1 wherein said actuating member is formed with at least one arcuate slot of approximately 90° and said force-transmitting member is provided with a pin in said slot whereby 90° lost motion is provided between said actuating member and said force-transmitting member.

3. In a two way plow having a frame whereon a plow assembly is rotatably mounted, the combination of, actuating means operatively interposed between said frame and said plow assembly for rotating the latter in opposite directions on said frame, an arm connected relative to said assembly for rotation therewith, a pair of spaced stop members on said frame engageable by said arm to define two extreme positions of rotation of said arm and plow assembly, and locking means at each extreme position comprising a sleeve fixed relative to said frame at each of said stop members and a locking element fixed to a rotatable shaft in each of said sleeves, each of said locking elements being engageable with said arm when at the respective stop member and being adjustable with respect to the latter for varying the amount of return movement of said plow assembly from its extreme position.

4. In a two-way plow having a frame and a plow assembly rotatably mounted thereon, the combination according to claim 3 wherein each locking element is secured to the respective rotatable shaft, and an adjustment nut is threadedly secured to one end of each of said shafts, whereby each of said nuts can be positioned as desired to define the return movement of said plow assembly from each of its said extreme positions.

5. In a two-way plow having a frame mounted relative to a tractor or the like and a plow assembly rotatably mounted on said frame, the combination comprising, a force-transmitting member connected relative to said plow assembly for rotation therewith between two extreme operating positions, an actuating member mounted for rotational movement relative to said frame, lost motion connecting means operatively interposed between said actuating member and said force-transmitting member, a hydraulic actuator operatively connected to said actuating member to rotate the latter substantially ninety degrees, said lost motion connecting means permitting said force-transmitting member and plow assembly to rotate substantially another ninety degrees under the force of gravity without causing further movement of said hydraulic actuator and actuating member to effect movement of said plow assembly to its next operating position, a reverse bleed hydraulic cylinder having a movable element capable of predetermined maximum rate of movement, and second lost motion connecting means operatively interposed between said movable element and said plow assembly to render said hydraulic cylinder operable to retard movement of said plow assembly when but only when the latter is free of said actuating member as effected by said lost motion connecting means.

References Cited

UNITED STATES PATENTS

| 2,982,362 | 5/1961 | Thompson | 172—210 |
| 3,007,531 | 11/1961 | Silver et al. | 172—225 |
| 3,175,624 | 3/1965 | Ward | 172—225 |
| 3,196,955 | 7/1965 | Ogle | 172—225 |

FOREIGN PATENTS

| 706,634 | 5/1941 | Germany. |
| 819,081 | 8/1959 | Great Britain. |

ABRAHAM G. STONE, *Primary Examiner.*

J. R. OAKS, *Assistant Examiner.*

UNITED STATES PATENT OFFICE
CERTIFICATE OF CORRECTION

Patent No. 3,386,518                                                   June 4, 1968

William Fisk Mellen

It is certified that error appears in the above identified patent and that said Letters Patent are hereby corrected as shown below:

In the heading to the printed specification, line 4, "(P. O. Box 488, Fullerton, Calif. 92632)" should read -- (P. O. Box 2032, Fullerton, Calif. 92633) --. Column 3, line 14, "bottom" should read -- bottoms --; line 72, "usuable" should read -- usable --. Column 7, line 3, "29" should read -- 39 --. Column 13, line 70, "shatt" should read -- shaft --.

Signed and sealed this 11th day of November 1969.

(SEAL)
Attest:

Edward M. Fletcher, Jr.                              WILLIAM E. SCHUYLER, JR.
Attesting Officer                                             Commissioner of Patents